United States Patent
Grandvuillemin

(10) Patent No.: US 10,663,409 B2
(45) Date of Patent: May 26, 2020

(54) SYSTEM AND METHOD FOR INSPECTING A TRANSPARENT CYLINDER

(71) Applicant: Becton Dickinson France, Le Pont de Claix (FR)

(72) Inventor: Arnaud Grandvuillemin, Montbonnot Saint Martin (FR)

(73) Assignee: Becton Dickinson France, Le Pont de Claix (FR)

( * ) Notice: Subject to any disclaimer, the term of this patent is extended or adjusted under 35 U.S.C. 154(b) by 8 days.

(21) Appl. No.: 16/078,821

(22) PCT Filed: Feb. 24, 2017

(86) PCT No.: PCT/EP2017/054269
§ 371 (c)(1),
(2) Date: Aug. 22, 2018

(87) PCT Pub. No.: WO2017/144634
PCT Pub. Date: Aug. 31, 2017

(65) Prior Publication Data
US 2019/0056335 A1    Feb. 21, 2019

(30) Foreign Application Priority Data
Feb. 24, 2016  (EP) .................................. 16305214

(51) Int. Cl.
*G01N 21/958* (2006.01)
*G01N 21/90* (2006.01)
*G01N 21/88* (2006.01)

(52) U.S. Cl.
CPC ....... *G01N 21/958* (2013.01); *G01N 21/9018* (2013.01); *G01N 21/9027* (2013.01); *G01N 21/9036* (2013.01); *G01N 2021/8822* (2013.01)

(58) Field of Classification Search
CPC .......... G01N 21/9027; G01N 21/9036; G01N 21/9018; G01N 21/958; G01N 2021/8822
See application file for complete search history.

(56) References Cited

U.S. PATENT DOCUMENTS 3,880,501 A * 4/1975 Munnerlyn ............ A61B 3/103
351/211
4,609,991 A * 9/1986 Minton .................. G01N 15/04
356/246

(Continued)

FOREIGN PATENT DOCUMENTS

EP        0344617 A2   12/1989
EP        0491555 A1    6/1992

(Continued)

*Primary Examiner* — Sang H Nguyen
(74) *Attorney, Agent, or Firm* — The Webb Law Firm

(57) ABSTRACT

An inspection system for detecting a particle in a transparent cylinder having a longitudinal axis and a diameter includes a light source able to illuminate a transparent cylinder, a mask able to block at least part of the light coming from the light source, the light source and the mask being arranged such that, when the transparent cylinder is positioned in the system for inspection, the light source, the mask and the transparent cylinder are substantially aligned along an inspection axis perpendicular to the longitudinal axis of said transparent cylinder and the mask is interposed between the light source and the transparent cylinder so as to prevent illumination of a first portion of the transparent cylinder having a width smaller than the diameter of the transparent cylinder while allowing illumination of a second portion of the transparent cylinder, the mask being configured to provide a contrast with a particle present in the first portion of the transparent cylinder and illuminated by light refracted by the second portion of the transparent cylinder.

14 Claims, 6 Drawing Sheets

(56) References Cited

U.S. PATENT DOCUMENTS

| | | | | |
|---|---|---|---|---|
| 4,682,023 A | * | 7/1987 | Yoshida | G01N 21/9054 250/223 B |
| 4,746,212 A | * | 5/1988 | Sudo | G01N 21/909 250/223 B |
| 4,868,404 A | * | 9/1989 | Hajime | G01N 21/909 250/559.22 |
| 4,902,137 A | * | 2/1990 | Krieg | G01N 21/9027 250/223 B |
| 4,924,083 A | * | 5/1990 | Ishikawa | G01N 21/90 209/525 |
| 5,215,883 A | * | 6/1993 | Chu | G01N 27/447 204/452 |
| 5,216,481 A | * | 6/1993 | Minato | G01N 21/9036 356/239.1 |
| 5,243,400 A | * | 9/1993 | Ringlien | G01N 21/90 356/239.4 |
| 5,438,405 A | * | 8/1995 | Lapidot | G01M 11/0264 356/124 |
| 6,239,870 B1 | | 5/2001 | Heuft | |
| 6,424,414 B1 | * | 7/2002 | Weiland | G01N 21/90 250/223 B |
| 9,151,707 B2 | * | 10/2015 | Lindner | G01N 21/90 |
| 2006/0008133 A1 | * | 1/2006 | Dordoni | G01N 21/8851 382/142 |

FOREIGN PATENT DOCUMENTS

| | | | |
|---|---|---|---|
| JP | S5940242 A | | 3/1984 |
| JP | 03163340 A | * | 7/1991 |
| JP | H03163340 A | | 7/1991 |
| JP | H05223746 A | | 8/1993 |
| JP | 2012026762 A | | 2/2012 |

\* cited by examiner

SYSTEM AND METHOD FOR INSPECTING A TRANSPARENT CYLINDER

CROSS-REFERENCE TO RELATED APPLICATIONS

This application is the United States national phase of International Application No. PCT/EP2017/054269 filed Feb. 24, 2017, and claims priority to European Patent Application No. 16305214.5 filed Feb 24, 2016, the disclosures of which are hereby incorporated in their entirety by reference.

FIELD OF THE INVENTION

The disclosure relates to an inspection system for a transparent cylinder, such as a cylinder made of transparent material and having a longitudinal axis and a diameter. In particular, the inspection system is adapted to detect particles or defects inside transparent cylinders. The disclosure further relates to a method for detection of particles and defects inside transparent cylinder.

BACKGROUND OF THE INVENTION

Transparent cylinders are widespread in various fields such as laboratory glassware in the form of beaker or metering cylinder, food container in the form of tub or bottle or medical glassware in the form of vial, cartridge or syringe. Whatever the field considered, these different containers require a high degree of quality and cleanliness, especially in the medical field where quality and/or cleanliness issues may have a direct impact on the safety of patients and medical staff.

Indeed, transparent cylinders, made of glass or plastic, are produced by complex manufacturing processes that may result in the formation of particles or defects in the material itself or on its surface. A careful inspection step of such transparent cylinders is thus required before delivery to the customer.

Such an inspection step is usually made automatically by cameras using a back end light positioned behind the transparent cylinder. However, this kind of inspection does not allow the detection of small-size cosmetic defects and/or glass particles. Furthermore, such an inspection system is not specific as it cannot differentiate the different types of observed defects.

There is therefore a need for a reliable system able to detect small glass particles and cosmetic defects.

SUMMARY OF THE INVENTION

A goal of the present disclosure is to propose an improved inspection system able to detect small-sized glass particles and defects. Another goal of the present disclosure is to provide an inspection system able to discriminate the different types of defects.

An example of the present disclosure is an inspection system for detecting a particle in a transparent cylinder, the transparent cylinder having a longitudinal axis and a diameter, the inspection system including:
  a light source able to illuminate a transparent cylinder,
  a mask able to block at least part of the light coming from the light source,
  the light source and the mask being arranged such that, when the transparent cylinder is positioned in the system for inspection, the light source, the mask and the transparent cylinder are substantially aligned along an inspection axis perpendicular to the longitudinal axis of said transparent cylinder and the mask is interposed between the light source and the transparent cylinder so as to prevent illumination of a first portion of the transparent cylinder having a width smaller than the diameter (D) of the transparent cylinder while allowing illumination of a second portion of the transparent cylinder, the mask being configured to provide a contrast with a particle present in the first portion of the transparent cylinder and illuminated by light refracted by the second portion of the transparent cylinder.

According to an example, the system further includes acquisition means or arrangement substantially aligned with the light source and the mask along the inspection axis for acquiring an image of the transparent cylinder such that, when the transparent cylinder is positioned in the system for inspection, the acquisition means or arrangement are opposite to the mask relative to the transparent cylinder.

According to an example, the system further includes a holder capable of supporting the transparent cylinder such that the longitudinal axis is perpendicular to the inspection axis.

The expression "substantially aligned" means, in one example, that the light source, the mask and the acquisition means are aligned on the inspection axis, although a small deviation is acceptable. The specific set-up of the inspection system according to the present disclosure can be easily realized by a skilled person in the art by checking the image acquired by the acquisition means or arrangement.

All kind of transparent cylinders can be inspected with the inspection system of the present disclosure, such as laboratory glassware, food containers or medical glass wares. Examples of such cylinders are beakers, metering cylinders, bottles, jars, medical vial, cartridges or syringes. Any other cylinders may be inspected as long as they are made of a transparent material. Thanks to the partial illumination of the transparent cylinder, any particle inside the non-illuminated part of the transparent cylinder is illuminated by an indirect light refracted by the illuminated portion of the transparent cylinder and is clearly visible in front of the mask acting as a dark background. Such illuminated particles may be easily detected by the acquisition means or arrangement such as a human eye or a video camera.

The non-illuminated portion of the transparent cylinder may range from 20 to 80% of the diameter of the transparent cylinder, preferably 30 to 70% and more preferably 50%.

The mask may be positioned in the inspection system with regard to the transparent cylinder such as to prevent illumination of a central portion, around the longitudinal axis of the transparent cylinder, in such a way that only the radial peripheries of the transparent cylinder are illuminated by the light source. This configuration of the inspection system is especially adapted to detect glass particles at the surface of the transparent cylinder or inside the transparent cylinder itself. In another configuration, the mask may be positioned such as to prevent illumination of a longitudinal periphery of the transparent cylinder, in such a way that a single radial periphery of the transparent cylinder is illuminated by the light source. Preferably, the illumination of the transparent cylinder may be prevented on a half of its diameter, the longitudinal axis being therefore a limit between the illuminated and the non-illuminated portion of the transparent cylinder. This configuration allows detecting both scratches and particles, the scratches being detectable in the illuminated central portion of the transparent cylinder and the particles in the non-illuminated portion of the transparent cylinder.

According to the configuration of the inspection system, particles may be detected or both particles and scratches during a single inspection step. Such an inspection system is thus able to differentiate a particle from a scratch which allows an accurate inspection of transparent cylinders.

In examples, the mask is opaque to the light emitted by the light source and preferably black-colored. This allows for an optimized contrast to detect easily particles above 300 μm. The mask may be made from any appropriate material such a wood, cardboard, plastic or metal.

The light source is preferably able to generate a white light. LEDs, halogen bulbs or neon tube may be used.

In examples, the inspection system is further provided with rotary means able to rotate the transparent cylinder with regard to the inspection system or to rotate the inspection system with regard to the transparent cylinder. The rotation of the inspection system or the rotation of the inspected cylinder allows in both cases a fast and comprehensive inspection of the transparent cylinder.

Another example of the present disclosure is a method to inspect a transparent cylinder having a longitudinal axis and a diameter for detecting a particle, the method including the steps of:
  providing a light source able to illuminate the transparent cylinder, and a mask able to block at least part of the light coming from the light source,
  aligning the light source, the mask and the transparent cylinder on an inspection axis, such that the longitudinal axis is perpendicular to the inspection axis and that the mask prevents illumination of a first portion of the transparent cylinder having a width smaller than the diameter of the transparent cylinder while allowing illumination of a second portion of the transparent cylinder, and
  obtaining an image of the transparent cylinder from a point of view opposite to the mask by a contrast provided by the mask with a particle present in the first portion of the transparent cylinder and illuminated by light refracted by the second portion of the transparent cylinder.

In examples, the method to inspect a transparent cylinder further includes a rotation of the transparent cylinder around its longitudinal axis with regard to the mask and the light source.

In examples, the method to inspect a transparent cylinder further includes a rotation of the mask and the light source around the longitudinal axis of the transparent cylinder.

Both rotations allow a fast and comprehensive inspection of the transparent cylinder.

DESCRIPTION OF THE INVENTION

Figure 1:
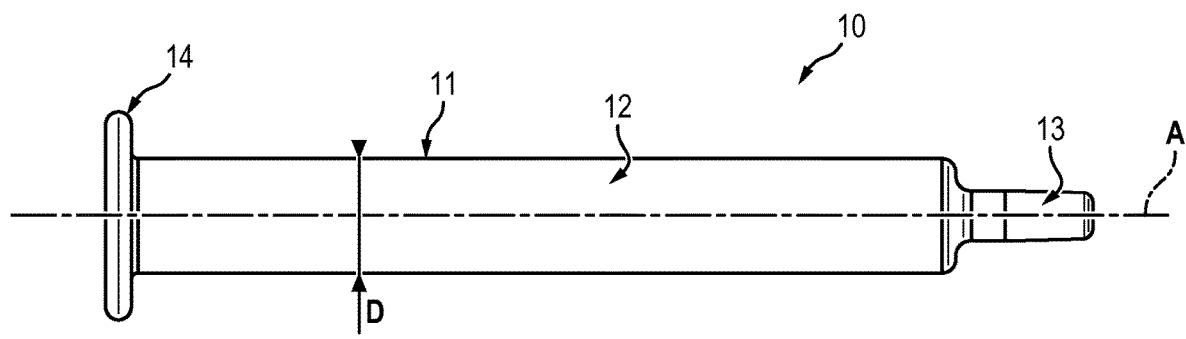
FIG. 1 shows a syringe as an example of a transparent cylinder to be inspected with an inspection system according to the present disclosure.

FIG. 1 shows a syringe 10 as an example of a transparent cylinder that can be inspected by a system according to the present disclosure. Others examples of transparent cylinders include cartridges, vials as well as bottles and glassware such as glasses, beakers or metering cylinders (not shown). The syringe 10 of FIG. 1 includes a cylindrical transparent barrel 11 having a diameter D, a longitudinal axis A and defining a tubular chamber 12 with two extremities. One of the extremities of the syringe 10 corresponds to a tip 13 used for the injection of medical products and that may be provided with a staked needle or an adaptor for connecting an intravenous line or any other types of connectors. The other extremity of the cylindrical transparent barrel 11 corresponds to a flange 14 used for gripping the syringe 10. The syringe 10 may be made from any transparent material such as glass or plastic, for example polyethylene, polypropylene, polycarbonate or cyclic polyolefin and any combination thereof.

Figure 2:
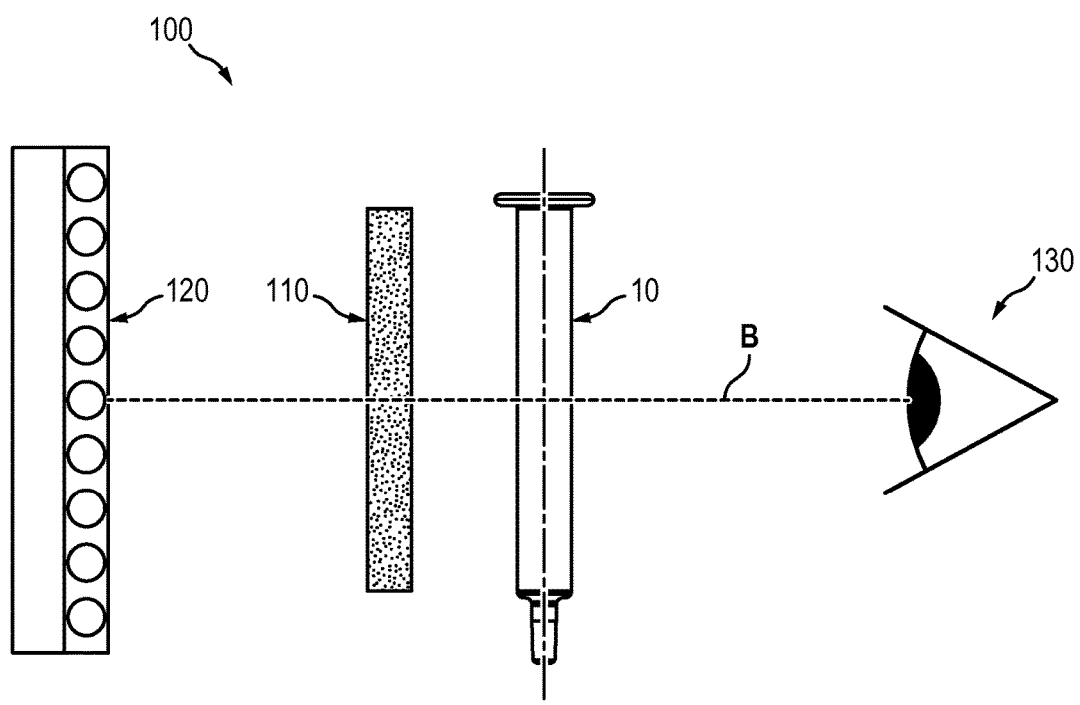
FIG. 2 is a schematic graph of an inspection system according to the present disclosure.

In FIG. 2, a schematic inspection system 100 includes a black mask 110, a light source 120 and acquisition means or arrangement 130. The mask 110, the light source 120 and the acquisition means or arrangement 130 are aligned on an axis B, hereinafter called inspection axis. To perform an inspection, the syringe 10 is placed between the mask 110 and the acquisition means or arrangement 130 so that its longitudinal axis A is perpendicular to the axis B. The acquisition means or arrangement 130 may be any acquisition means or arrangement capable of obtaining an image of the cylinder, for example the eye of an operator or a video camera.

Figure 3:
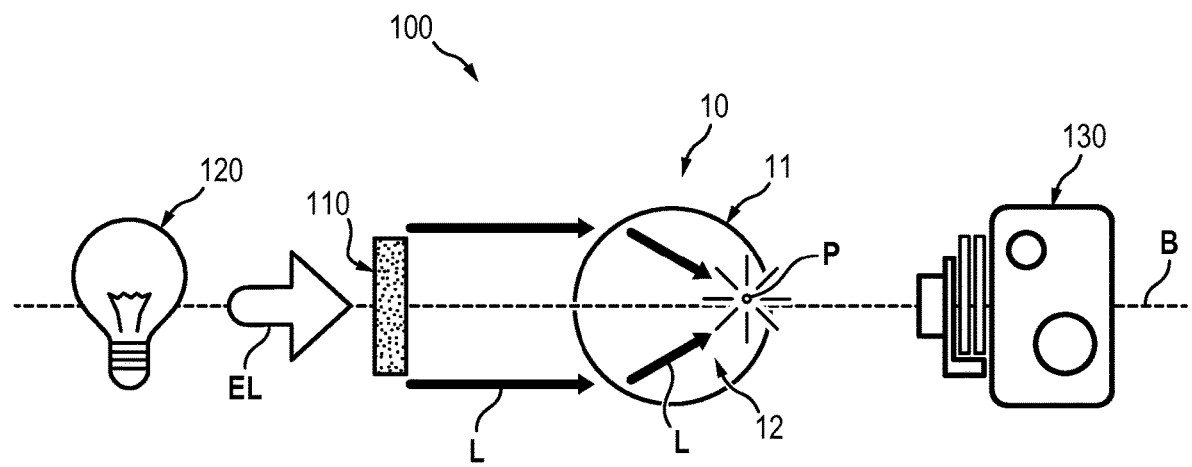
FIG. 3 shows the operating principle of an inspection system according to FIG. 2.
Figure 4:
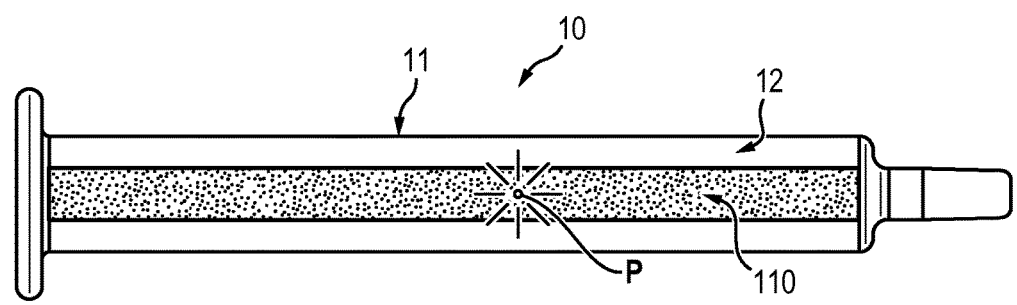
FIG. 4 shows a particle as detected by the inspection system according to FIG. 2.

The operational principle of the inspection system 100 according to the present disclosure is described with reference to FIG. 3. As already mentioned, the light source 120, the mask 110, the transparent cylinder under inspection, for example a syringe 10, and the acquisition means or arrangement 130 are aligned on the inspection axis B, the syringe 10 being placed between the mask 110 and the acquisition means or arrangement 130. To that end, the syringe may be supported by a holder (not shown) or handheld by an operator. When the light source 120 is switched on, a portion of the emitted light EL is blocked by the mask 110 and only the peripheral light L passing around the mask 110 thus reaches the syringe barrel 11. Because of the cylindrical shape of the syringe barrel 11, the light is refracted to illuminate particles and for instance, a particle P. As shown in FIG. 4, which shows the syringe and mask from the point of view of the acquisition means or arrangement 130, the illuminated particle P is easily detectable on an image acquired by the acquisition means or arrangement 130, thanks to the black mask that acts as a black background. A rotation of the syringe 10 around its longitudinal axis A or a rotation of the light source, the mask and the acquisition means or arrangement around the longitudinal axis A of the syringe 10 is preferable in order to inspect the whole circumference of the syringe 10.

The width and the positioning of the mask 110 with regard to the light source 120 and the syringe 10 must be chosen in order to block the illumination of 20 to 80% of the diameter of the syringe 10. Preferably, 30 to 70% of the diameter of the syringe 10 are not illuminated, more preferably 50%, as shown in FIG. 4. The dimensions and the positioning of the mask 110 with regard to the light source 120 and the syringe 10 may thus be selected for each specific inspection device according to the size of the transparent cylinders to be inspected. In the same way, the arrangement of the mask 110, the transparent cylinder 10, the light source 120 and the acquisition means or arrangement 130 into the inspection system 100 may be optimized to obtain an acquired image as the one shown in FIG. 4.

Moreover, the mask 110 is preferentially a plain plate, and as such, configured to block incoming light over the entirety of its exposed surface that receives light from the light source.

Figure 5A:
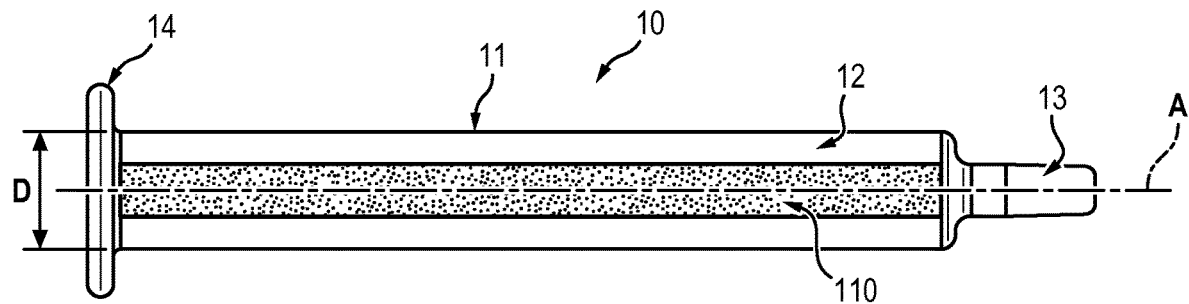
FIGS. 5A-5C show different possible positions of the mask of the inspection system according to FIG. 2 as regards a syringe according to FIG. 1.
Figure 5B:
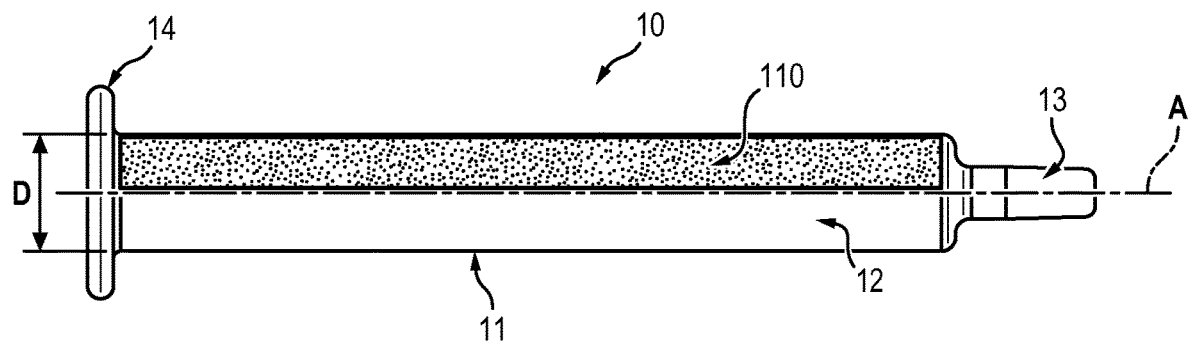
Figure 5C:
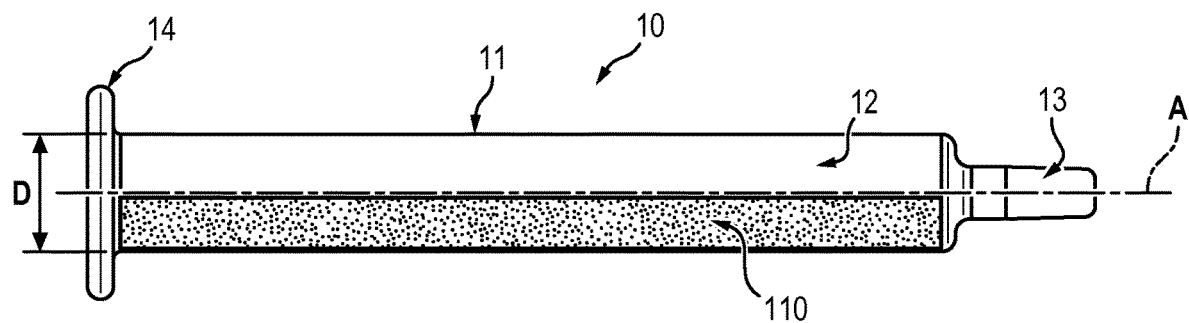

In addition, FIGS. 5A-5C show different positioning of the mask 110 with respect to the syringe 10, as viewed by the acquisition means or arrangement 130. In FIGS. 4 and 5A, the mask is centered relative to the longitudinal axis A of the syringe 10. This prevents illumination of a central portion of the syringe and this specific configuration is optimal for the detection of glass particles, which are particularly visible in the middle of the transparent barrel 11. In FIGS. 5B and 5C, the mask 110 is decentered radially relative to the longitudinal axis A of the syringe 10 and only covers half of the diameter D, above or below the longitudinal axis A. This position prevents illumination on a half of the diameter D of the longitudinal barrel 11 and allows the detection of both scratches and particles as it will be explained below.

In FIGS. 5A-5C, the mask 110 has the same length as the barrel 11, which allows inspection of the whole barrel length. However, specific applications may require a mask covering only a partial length of the syringe 10.

Furthermore, the mask 110 is preferably positioned parallel to the syringe axis A, although a small deviation may be acceptable.

Finally, the mask 110 is preferably opaque to the light emitted by the light source and black-colored in order to provide the greatest possible contrast with particles P. It may be made from any suitable materials such as metal, plastic, paper or cardboard.

Thanks to the mask 110, the syringe 10 is illuminated on only a limited portion of its diameter D, the mask 110 both blocking part of the light from the light source 120 and acting as a dark background for the detection of illuminated particles. The inspection system 100 therefore provides a simple and reliable way to detect small size particles, for example particles above 300 μm.

Figure 6:
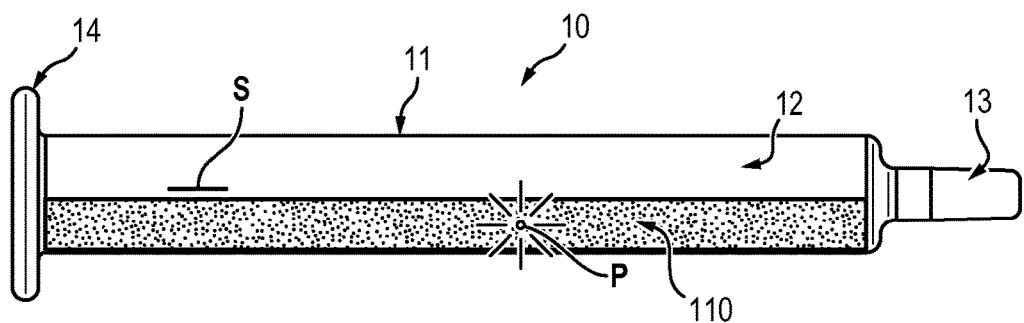
FIG. 6 shows a particle and a scratch as detected with the mask as positioned in FIG. 5C.

In addition to the detection of particles, the configurations of the inspection system as shown in FIGS. 5B and 5C also allow the detection of scratches. Indeed, if the particles remain visible by contrast with the mask 110, the scratches are easily visible under direct illumination, in the portion where the light is not masked by the mask 110. This case is illustrated in FIG. 6 where the acquisition means or arrangement 130 are able to detect simultaneously both a scratch S in the "white" illuminated region and a particle P in the "black" non-illuminated region.

The light source 120 may be any light source producing a homogeneous light. Preferably, the light is a white color light that may be obtained for example with LEDs, halogen bulbs or neon tubes.

In case the acquisition means or arrangement comprise a video camera, the acquired pictures may be processed with commercially available software designed to identify particles and scratches. Such software may also measure the size of the detected defects and help to reject cylindrical containers having unacceptable defects with respect to the targeted quality level.

Figure 7:
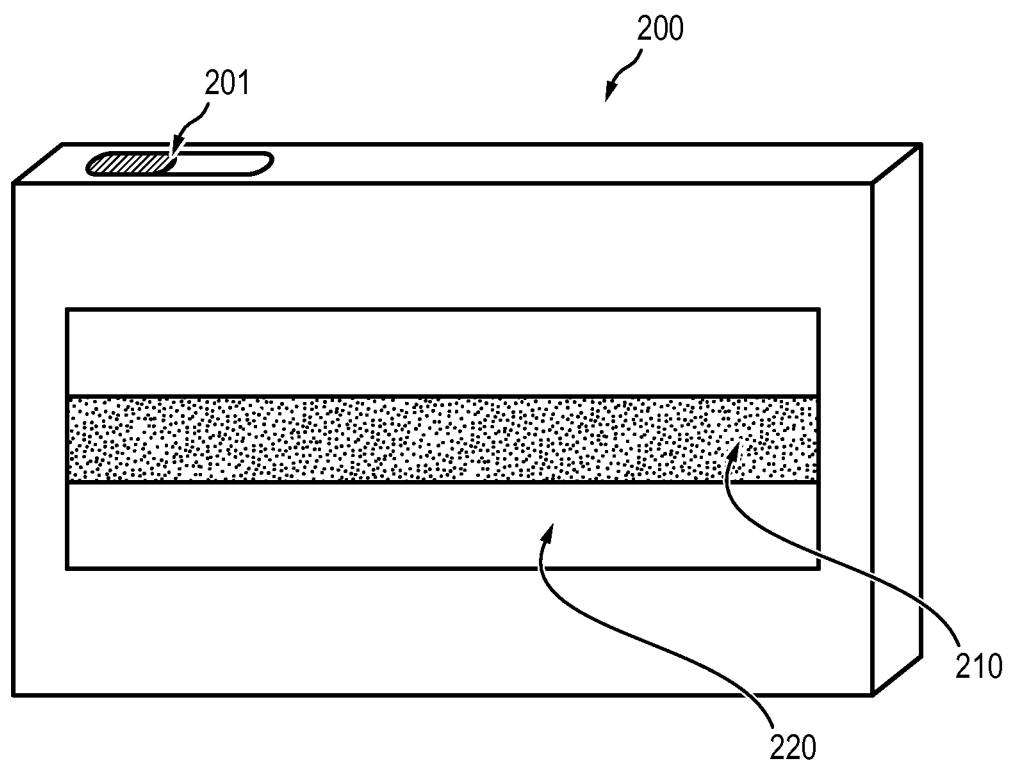
FIG. 7 shows a first example of an inspection system according to FIG. 2.

In a first example of the present disclosure visible in FIG. 7, a portable inspection system 200 includes a light source 220 and an integrated mask 210. The inspection system 200 is further provided with a switch button 201 and integrated batteries (not shown). For example, this portable inspection system 200 may be used manually by an operator for random manual inspections on a manufacturing line. A syringe 10 may be positioned by the operator at the right distance from the inspection device 200 in order to obtain an image as the ones shown in FIG. 4 or 6. The syringe 10 may also be rotated appropriately by the operator to inspect the whole barrel circumference.

Figure 8:
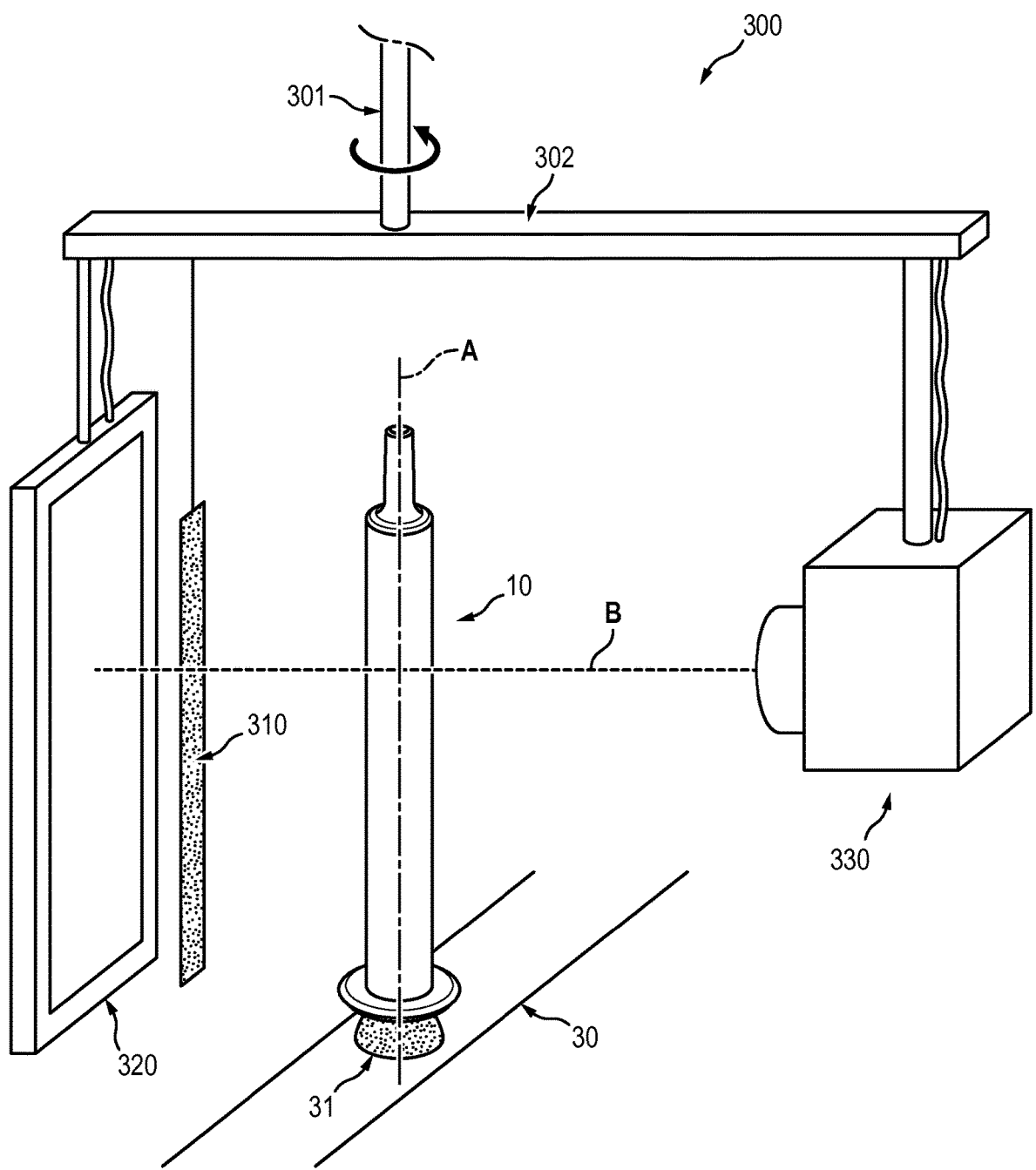
FIG. 8 shows a second example of an inspection system according to FIG. 2.

In a second example of the present disclosure visible in FIG. 8, an inspection system 300 is set up to inspect syringes 10 on an in-line manufacturing process. Syringes 10 are carried on a transportation system 30 including holders such as plugs 31 able to maintain the syringes in a vertical positioning. The inspection system 300 includes a rotatable axis 301 and a horizontal frame 302. The mask 310, the light source 320 and the acquisition means or arrangement 330 are held by the horizontal frame 302 and aligned on the inspection axis B. When a syringe 10 is presented to the inspection system 300, the light source 320 is switched on and the rotatable axis 301 is motorized by an electric motor (not shown) in order to rotate the mask 310, the light source 320 and the acquisition means or arrangement 330 around the longitudinal axis of the syringe 10. A set of pictures is acquired by the acquisition means or arrangement 330 to inspect the whole circumference of the syringe barrel 11 in a very short period of time without removing the inspected syringe from the in-line manufacturing process. The optimal rotating speed depends on the size of the syringe itself, the size of the defects to be detected as well as the quality and the parameters of the acquisition means or arrangement. For example, 60 images with a 13 MPx camera may be captured in 10 to 20 seconds. A casing (not shown) may be provided around the inspection system 300, to prevent or limit light coming from other sources that may reduce the efficiency of the light source 320, the casing thus enhancing the contrast and the detection quality of the inspection device 300.

Figure 9:
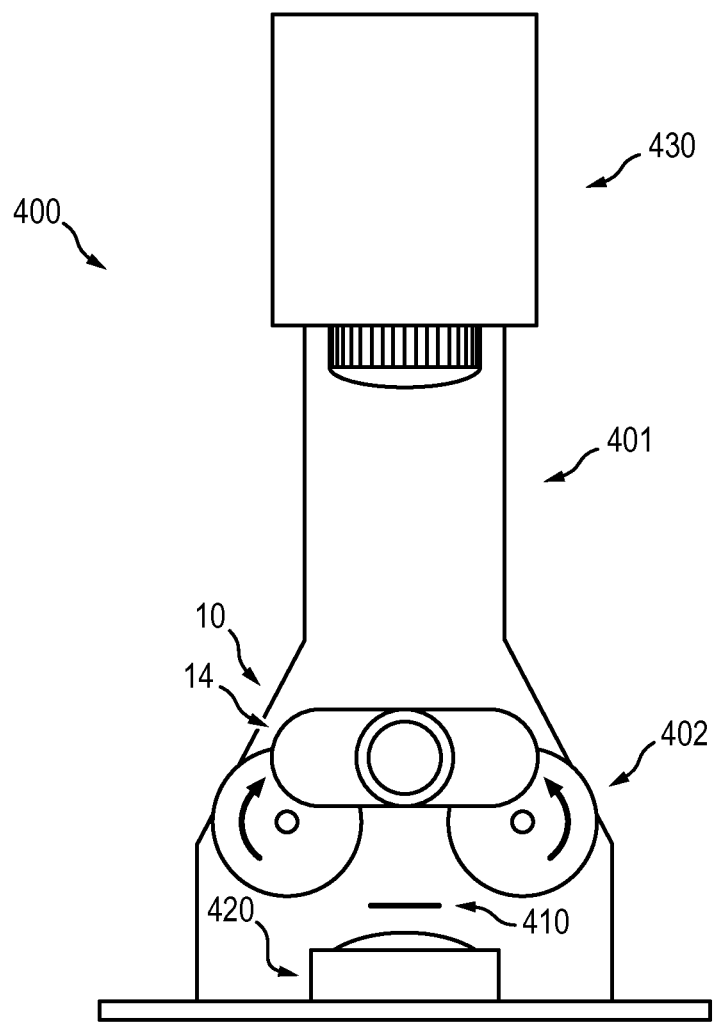
FIG. 9 shows a third example of an inspection system according to FIG. 2.

In a third example disclosed in FIG. 9, an inspection system 400 is set-up for the automated inspection of a syringe 10. This inspection system 400 is provided with a frame 401 supporting a mask 410, a light source 420 and acquisition means or arrangement 430. The syringe 10 is accommodated on a rotary holder 402 includes two axes (not shown) provided with three wheels (only two are visible in FIG. 9, the third wheel being hidden by one the two visible wheels). At least one of the two axes is coupled to an electric motor (not shown) in order to maintain the syringe 10 in rotation, the second axis being either motorized or free to rotate. This rotary holder 402 allows the full rotation of the syringe 10 in order to inspect the whole circumference of the syringe barrel 11. The inspection 430 means may be either a video camera similar to the acquisition means or arrangement 330 or a magnifying glass for a direct visual inspection. The inspection system 400 according to this example is especially adapted for an in-depth inspection of high quality syringes or transparent cylinders before their delivery to customers that will proceed to filling with medical products.

As applicable, all individual features that are shown in the individual embodiments can be combined and/or exchanged with each other without departing from the scope of the disclosure.

The invention claimed is:

1. An inspection system for detecting a particle on a surface of a transparent cylinder having a longitudinal axis and a diameter, the inspection system comprising:
a light source to illuminate a transparent cylinder,
a mask to block at least part of a light coming from the light source,
the light source and the mask being arranged such that, when the transparent cylinder is positioned in the system for inspection, the light source, the mask and the transparent cylinder are substantially aligned along an inspection axis perpendicular to the longitudinal axis of said transparent cylinder and the mask is interposed between the light source and the transparent cylinder so as to block the light emitted by the light source on a first portion of the transparent cylinder having a width smaller than the diameter of the transparent cylinder while allowing illumination of a second portion of the transparent cylinder by light emitted by the light source,
an image acquisition arrangement substantially aligned with the light source and the mask along the inspection axis, opposite the mask relative to the transparent cylinder, for acquiring an image of the transparent cylinder, and
the mask and the image acquisition arrangement being configured so that a particle present on the surface of the transparent cylinder, located in the first portion of said transparent cylinder and illuminated by light refracted by the second portion of the transparent cylinder, is visible by the image acquisition arrangement by contrast with the mask.

2. The inspection system according to claim 1, further comprising a holder for supporting the transparent cylinder such that the longitudinal axis is perpendicular to the inspection axis.

3. The inspection system according to claim 1, wherein the mask is arranged such that the width of the non-illuminated portion of the transparent cylinder ranges from 20 to 80% of the diameter of the transparent cylinder.

4. The inspection system according to claim 1, wherein the mask is arranged such that the width of the non-illuminated portion of the transparent cylinder is equal to 50% of the diameter of the transparent cylinder.

5. The inspection system according to claim 1, wherein the mask is arranged such that the non-illuminated portion of the transparent cylinder is a central portion of the transparent cylinder.

6. The inspection system according to claim 1, wherein the mask is arranged such that the non-illuminated portion of the transparent cylinder extends on a side of the transparent cylinder.

7. The inspection system according to claim 1, wherein the mask is opaque to the light emitted by the light source.

8. The inspection system according to claim 1, wherein the mask is black-colored.

9. The inspection system according to claim 1, wherein the light source generates a white light.

10. The inspection system according to claim 1, further comprising a rotary arrangement to rotate the transparent cylinder along the longitudinal axis with regard to the light source and the mask or to rotate the light source and the mask about the longitudinal axis of the transparent cylinder.

11. The inspection system according to claim 10, further provided with a rotary holder intended to rotate the transparent cylinder to be inspected around the longitudinal axis.

12. A method to inspect a transparent cylinder having a longitudinal axis and a diameter for detecting a particle on a surface of the transparent cylinder, comprising:
providing a light source to illuminate the transparent cylinder, and a mask to block at least part of a light coming from the light source,
providing an image acquisition arrangement for acquiring an image of the transparent cylinder,
aligning the light source, the mask, the transparent cylinder, and the image acquisition arrangement on an inspection axis, such that the longitudinal axis is perpendicular to the inspection axis, that the mask is interposed between the light source and the transparent cylinder so as to block the light emitted by the light source on a first portion of the transparent cylinder having a width smaller than the diameter of the transparent cylinder while allowing illumination of a second portion of the transparent cylinder by light emitted by the light source, and that image acquisition arrangement is opposite the mask relative to the transparent cylinder, and
obtaining an image by the image acquisition arrangement of a particle present on the surface of the transparent cylinder, located in the first portion of the transparent cylinder and illuminated by light refracted by the second portion of the transparent cylinder, by contrast with the mask.

13. The method to inspect a transparent cylinder according to claim 12, further comprising a rotation of the transparent cylinder around the longitudinal axis with regard to the mask and the light source.

14. The method to inspect a transparent cylinder according to claim 12, further comprising a rotation of the mask and the light source around the longitudinal axis of the transparent cylinder.

* * * * *